United States Patent Office 3,423,109
Patented Jan. 21, 1969

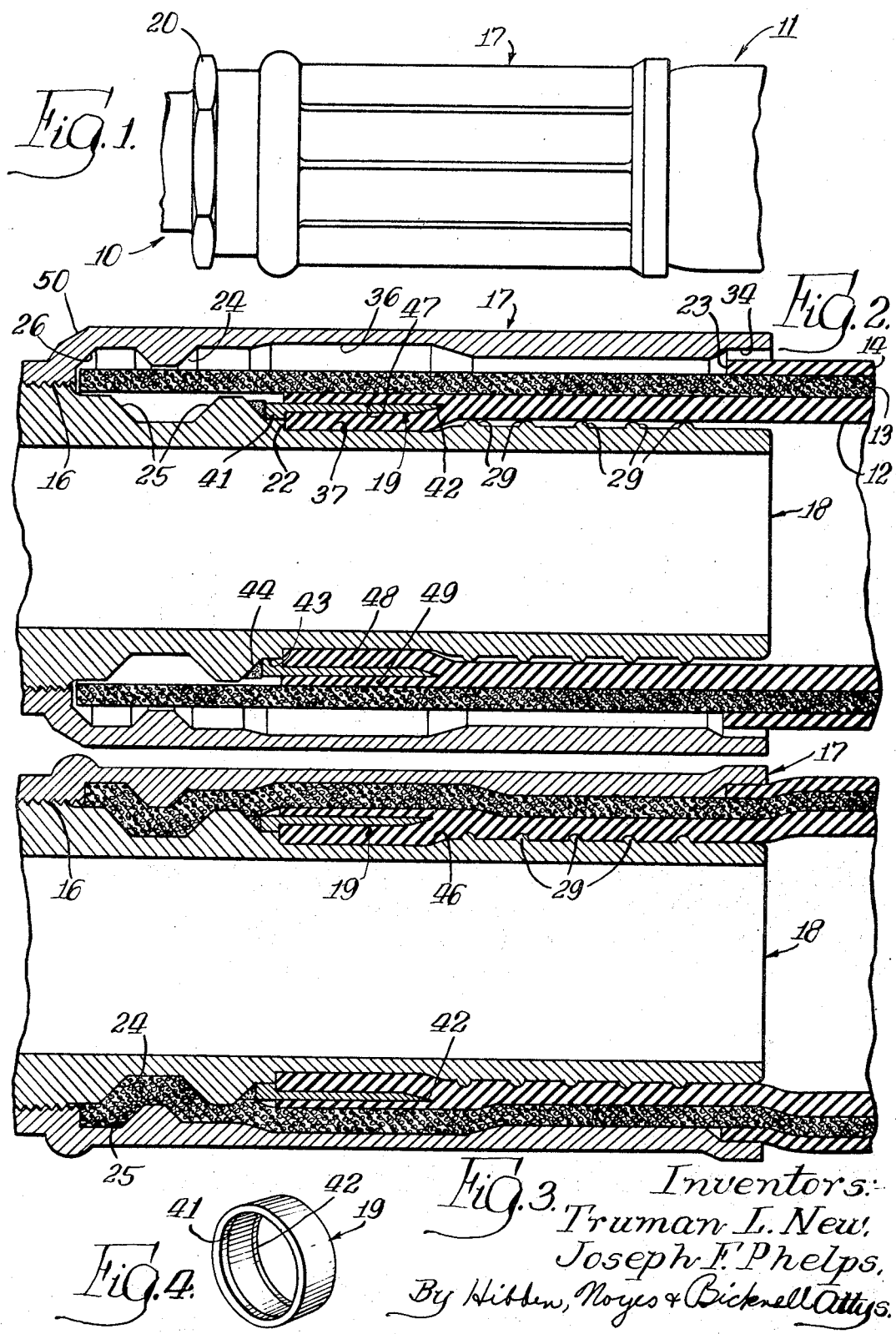

3,423,109
HOSE FITTING
Truman L. New and Joseph F. Phelps, Fort Worth, Tex., assignors to Stratoflex, Inc., Fort Worth, Tex., a corporation of Texas
Filed Mar. 30, 1966, Ser. No. 538,688
U.S. Cl. 285—149
Int. Cl. F16l *17/02*
2 Claims

ABSTRACT OF THE DISCLOSURE

This disclosure deals with a hose fitting for use with hose including a flexible inner tube and a wire reinforcement which surrounds the inner tube. The fitting includes a gripping section wherein a bared portion of the hose reinforcement is gripped, and two sealing sections, the two sealing sections being particularly effective at different pressure ranges. One of the two sealing sections preferably comprises a gland-type seal, and the other of the two sealing portions preferably comprises a compression type seal.

---

Conventional fittings for use with hose of the type including a flexible inner tube which is covered by a layer of wire reinforcement are designed to be mechanically secured to an end of such a hose and to be sealingly connected to the hose. The mechanical and seal connections should of course be effective over relatively wide pressure and temperature ranges.

The mechanical connection is preferably such that the wire reinforcement alone is gripped by a compressive force. If radially adjacent layers of the inner tube and the wire reinforcement were gripped, the presence of the relatively soft inner tube, which is usually made of rubber, would weaken the mechanical connection particularly at sustained high temperatures.

Either of two types of seals have been frequently used in such assembly. In one, a compressive force is applied to the inner tube to prevent leakage, and in the other a lip or gland is formed on the inner tube, which is forced against a member of the fitting by the internal fluid pressure in order to form a seal. The former type of seal is effective at relatively low internal fluid pressures but loses its effectiveness at relatively high temperatures, particularly when in the presence of a sustained high temperature. The latter type of seal on the other hand, does not become effective until relatively high pressures are reached, and it tends to maintain its effectiveness for a relatively long period of time at sustained high temperatures.

Due to the foregoing characteristics, conventional hose fittings have not been completely effective over relatively wide pressure and temperature ranges.

The foregoing deficiencies are overcome in accordance with the present invention by providing a hose fitting including a hose gripping section and two separate sealing sections. One sealing section is effective at relatively low pressures and the other sealing section is effective at higher fluid pressures. The low pressure sealing section is preferably a compression-type seal, the high pressure sealing section is preferably a gland-type seal, and the gripping section preferably grips the hose reinforcement by bending it into a sinusoidal configuration.

Accordingly, it is an object of this invention to provide a novel hose fitting which firmly grips a hose and forms an effective fluid seal over a relatively wide pressure range.

It is another object to provide a fitting of the above character, which has two separate sealing connections.

Still another object is to provide a fitting of the above character, including one seal which is effective at relatively low pressures and another seal which is effective at relatively high pressure.

Other objects and advantages of the invention will become apparent from the following detailed description taken in conjunction with the accompanying figures of the drawing, in which:

FIG. 1 is an elevational view of an assembly including a hose and a fitting, embodying the invention;
FIG. 2 is a sectional view of the hose and fitting when partially assembled;
FIG. 3 is a sectional view of the hose and fitting when completely assembled; and
FIG. 4 is a perspective view of one part of the fitting.

In general, the fitting is adapted to be used with a hose comprising an inner tube, a wire reinforcement, and an outer cover. Before assembly, the inner tube and the outer cover are removed adjacent the end of the hose to bare the end portion of the reinforcement. The fitting comprises a socket, a nipple, and an insert, the nipple extending through the insert in telescopic relation and being secured thereto. When assembled the nipple and the insert are positioned within the socket and are secured thereto, the insert including a tubular portion which is radially spaced from the socket and from the nipple. The socket and the nipple define an annular opening therebetween which receives the prepared end of the hose, the socket being positioned over the end of the hose and the nipple being inserted into the end of the hose. The fitting includes a gripping section, and two sealing sections. In the gripping section, the socket and the nipple are provided with radial projections which grip the bared end portion of the reinforcement. Rearwardly of the gripping section is a forward sealing section wherein a fluid tight seal is provided between the tubular portion of the insert and the nipple, and rearwardly of the first sealing section is a rearward sealing section wherein a fluid tight seal is provided between the nipple and the socket. The forward sealing section is particularly effective at relatively high fluid pressures whereas the rearward sealing section is particularly effective at relatively low fluid pressures.

In assembling the fitting on the hose, the socket is positioned over the end of the hose, the nipple is inserted into the socket and into the end of the hose, and the nipple is then threaded to the socket. Of course, the nipple may be threaded to the socket and the hose inserted thereafter. Alternatively, the nipple may be inserted into the socket and brazed thereto, and the hose then inserted into the opening between these two members. An annular slit is formed in the forward end portion of the inner tube, which receives the tubular portion of the insert. The slit is preferably formed by providing a sharp edge at the rearward end of the insert, which edge cuts into the inner tube during assembly. The hose and fitting assembly is then positioned in a crimping or swaging apparatus. Hereinafter the term crimping is intended to include both crimping and swaging operations. Such apparatus includes crimping dies which are preferably constructed so that the gripping section of the fitting is crimped first and, after the wire reinforcement is in crimped position, the sealing sections of the fitting are crimped.

In greater detail, FIG. 1 illustrates a hose fitting, indicated generally by the numeral 10, connected to the end of a hose, indicated generally by the numeral 11. With reference to FIGS. 2 and 3, the hose 11 includes an inner tube 12 made of a resilient material such as rubber or similar material, a wire reinforcement 13 covering the inner tube 12, and a cover 14 over the reinforcement 13, the cover 14 also being made of a resilient material such as rubber or other similar material. The inner tube 12 of the hose 11 is cut away from the end of the hose as shown in FIGS. 2 and 3 to expose the inner surface of the wire reinforcement 13, and the outer cover 14 is also cut away a distance approximately twice that of the inner tube 12 to expose the outer surface of the wire reinforcement 13.

The hose fitting 10 comprises a socket 17, a nipple 18, and an insert 19, the socket 17 being adapted to be positioned around the end of the hose 11 and the nipple 18 being adapted to be inserted into the end of the hose 11. The nipple 18 is positioned within the socket 17 in telescopic relation therewith, and these two members are secured together as by a threaded connection indicated generally by the numeral 16. An enlarged portion 20 (FIG. 1) having a wrench engageable outer surface is also formed on the nipple, and the forward end of the nipple may be provided with means (not shown) such as a swivel nut or threads for attaching the fitting to another coupling member (not shown).

An annular opening, closed at the forward end as by the threaded connection 16, is provided between the socket 17 and the nipple 18, into which the hose 11 extends. The forward portion of the fitting 10 from the closed end of the opening to substantially the end 22 of the inner tube 12 is referred to as the gripping section, and the rearward portion of the fitting from substantially the end 22 of the tube 12 to substantially the end 23 of the outer cover 14 is referred to as forward and rearward sealing sections.

In the gripping section, the socket 17 and the nipple 18 are respectively provided with annular, radially extending projections 24 and 25. In the embodiment illustrated, the projections 24 and 25 have slanted sides and flat tops. As shown in FIGS. 2 and 3 the socket 17 has one projection 24 and the nipple 18 has two projections 25, although more projections could be provided on each of the members, the projection 24 on the socket 17 being radially aligned with the recess between the projections 25 of the nipple 18, which makes the opening in the gripping section generally sinusoidal.

The opening between the nipple 18 and the socket 17 may be radially enlarged in the area indicated by the numeral 26 adjacent the forward end to prevent cutting of the wire reinforcement during crimping. The wire may have a tendency to double back or bunch at the forward end of the opening when the hose is inserted into the fitting, and the enlarged area 26 eliminates the danger of cutting or tearing the wire of the reinforcement 13 when doubling back occurs and the socket 17 is crimped.

In the rearward sealing section of the fitting 10, a compression type seal is used. To this end, the outer periphery of the nipple 18 is provided with a plurality of radially outward extending annular ribs 29 which may be sharp or rounded. In the present instance they are shown as having round upper surfaces. While the inner periphery of the socket 17 at the sealing section may be provided with a plurality of annular ribs, in the present instance it is shown as being smooth. The socket 17 at the rearward end of the fitting is further provided with an axially extending skirt portion 34 which overlies the end portion of the cover and thereby helps to prevent tearing of the cover.

In the forward sealing section of the fitting 10, which is located axially between the gripping section and the rearward sealing section, a gland type seal is used. To this end, the inner periphery of the socket 17 is recessed as indicated at 36. The outer periphery of the nipple 18 is also recessed as indicated at 37, the recesses 36 and 37 being substantially radially aligned and the insert 19 being located substantially in radial alignment with the two recesses. The insert 19 is a relatively thin walled tubular member and may be a straight tube or have a radially inwardly extending flange 41 formed at its forward end. The rearward end of the insert is preferably formed with a sharp edge 42, the sharp edge 42 being located at the outer surface of the insert and the rearward end surface of the insert slanting axially forwardly and radially inwardly from the sharp outer edge 42.

The insert 19 is preferably rigidly secured to the outer periphery of the nipple 18 as by welding. Thus, if the insert 19 is a straight tube, the inner surface of the tube would be snugly received over a step 43 formed on the nipple adjacent the rearward edge of the rearmost projection 25, and the space between the forward end of the insert 19 and this projection 25 is filled with weld material 44. Where the flange 41 is provided, the step 43 is dimensioned to fit the flange 41. The weld material 44 serves both to secure the insert 19 to the nipple 18 and also to form a smooth outer surface connecting the outer periphery of the insert 19 with the adjacent projection 25.

The axial length of the flange 41 is substantially equal to the axial length of step 43, so that the flange and the step provide a smooth radially extending surface at the forward end of the annular opening formed between the nipple and the insert. The insert extends rearwardly to substantially the rearward end 46 of the recess 37, and the end 46 is preferably slanted at generally the same angle as the slant at the rearward end of the insert 19.

The radial dimensions of the recesses 36 and 37 and the insert 19 are determined by the dimensions of the hose. As shown in FIG. 2, the outer surface of the insert 19 is intermediate the inner and outer surfaces of the tube 12 when the hose 11 is in an unstressed condition, and an annular slit 47 is formed in the end of the tube 12, which receives the insert 19 therein. The diameter of the slit 47 is substantially equal to the outer diameter of the tubular insert 19, and the slit 47 forms inner and outer flaps 48 and 49 from the material of the tube 12. When the hose is positioned with the insert 19 extending into the slit 47, the outer flap 49 extends over the outer surface of the insert 19 in the annular space between the socket and the insert and the inner flap 48 extends into the annular space provided between the insert 19 and the recessed portion of the nipple 18. The depth of the recess 37 and the dimensions of the insert 19 are such that the inner flap 48 may be inserted into the annular space between them and be substantially free of compressive forces due to the nipple and the insert.

When the nipple 18 is inserted into the end of the hose 11, the insert 19 extends into the slit 47 as previously explained, and the outer flap 49 overlies the outer periphery of the recess 36 and the dimensions of the insert 19 are such that there are little or no compressive forces on the outer flap 49 after the hose and fitting has been assembled and secured together by crimping.

When assembling the fitting on the hose 11, the hose is first prepared, as heretofore mentioned, by cutting away the inner tube 12 and outer cover 14 to expose the wire reinforcement 13. The length of the tube 12 removed is substantially equal to the length of the gripping section and the length of the cover 14 removed is substantially equal to the distance from the forward end of the opening for the hose, to the skirt 34.

While the slit 47 may be formed by a special tool before assembly of the hose with the fitting, the nipple is preferably inserted into the end of the hose until the sharp rearward edge 42 of the insert 19 engages the forward end of the inner tube 12. The nipple is then forced further into the hose preferably with a turning movement, thereby causing the sharp edge 42 to cut into the inner tube and form the annular slit 47. As the slit is being formed by cutting, the inner flap 48 is flexed radially inward and slides into the space between the nipple and the insert, while the outer flap 49 slides axially over the insert. When the inner flap 48 reaches the forward end of the space, the slit 47 is completely formed and the nipple is then withdrawn from the hose so that the slit may be inspected before final assembly.

To complete the assembly, the socket 17 is positioned over the end of hose 11 and the nipple 18 is inserted into the socket and into the end of the hose. The insert 19 again enters the slit 47, and the nipple is rotated to engage the threads 16 and thereby secure the nipple to the socket.

In the case of a one piece brazed construction, the socket and the nipple are brazed together, instead of having the threaded connection 16, and then the end of the hose is inserted into the annular opening between them.

From FIG. 2 it can be seen that the radial width of the opening between the socket and the nipple before crimping is made sufficiently large that the hose 11 can be positioned in the fitting relatively easily. The fitting 10 and hose 11 assembly is then positioned in a crimping or swaging apparatus (not shown) and the gripping section of the fitting 10 is preferably crimped first. The gripping section of the fitting when crimped as shown in FIG. 3 bends the reinforcement 13 in a sinusoidal form, and applies a radially compressive load on the hose reinforcement 13. Thereafter the portion of the socket including the two sealing sections is crimped, the finished structure being shown in FIG. 3. The skirt 34 of the socket is also crimped, but by a lesser amount, over the cover 14 and prevents the hose from being bent at a sharp angle immediately outside of the fitting. The skirt 34 also bears against the cover 14 and preferably provides a fluid tight seal which protects the wire reinforcement 13 from moisture or a corrosive atmosphere entering from the outside. To prevent cracking of the socket 17 at the forward end of the gripping section, the wall portion 50 at this forward end is slanted outwardly and rearwardly from the threads 16. The wall portion 50 is not engaged by the crimping dies, and during the crimping operation the wall portion 50 is bent rather than crimped, thereby reducing the possibility of cracking the socket.

By crimping the gripping section first, the wire reinforcement 13 is allowed to move and settle in its final crimped position before the remainder of the socket is crimped. If the sealing sections were crimped first or the gripping and sealing sections were crimped simultaneously, a portion of the wire reinforcement might move during the crimping of the gripping section and adversely affect the seal between the nipple and the inner tube 12.

Due to the offset projections 24 and 25 on the socket and the nipple in the gripping section, the opening in this section has a substantially constant width and is gradually curved, preferably having a generally sinusoidal shape. This is advantageous because sharp bends of the wire are avoided, thereby reducing the danger of wire damage during crimping. Further, gripping does not depend solely on friction as in conventional compression fittings. A sine wave gripping section of the character disclosed differs from the usual compression fittings in that end thrust transmitted to the reinforcement 13 is not transmitted longitudinally but obliquely, and the thrust is therefore a vector value less than direct thrust.

The projections 24 and 25 bend the wire reinforcement, and the end thrust on the reinforcement is reduced by each bend. The difference between the end thrusts on the portions of the reinforcement on opposite sides of a bend depends upon the angle at which the reinforcement 13 is bent. If the angle were 90° the end thrust on the portion of the reinforcement after the bend would be zero, but such a sharp bend would be undesirable because the wire reinforcement might crack at the bend. On the other hand, if the angle were zero, the entire end thrust would be transmitted and gripping of the reinforcement would be by friction only. Factors affecting the choice of the angle of bend are the diameter of the hose, the thickness of the reinforcement, and the stiffness of the wire used in the reinforcement. The shape of the projections 24 and 25 on the socket and the nipple are such as to produce the sine wave configuration of the reinforcement when the socket is swaged. The surface of the projections need not be curved as in a true sine wave but may have flat sides and crests as shown. The crests are preferably provided so that the reinforcement will not be sharply bent over the projections.

In addition to gradually decreasing the end thrust on the reinforcement by bending it, the end thrust on the reinforcement also gradually decreases due to frictional gripping of the reinforcement caused by compression of the portion of the reinforcement in the gripping section between the socket and the nipple.

An advantage of gripping the reinforcement in the foregoing manner is that it is highly effective with hose having a standard type of reinforcement made up of layers of wire which spiral around the hose, with adjacent layers oppositely spiraling, in addition to a standard type hose wherein the reinforcement comprises wire strands which are woven or braided, each strand comprising a plurality of wires. In the former spiral construction, each layer of wire is separated from adjacent layers by an interlay of relatively soft material. Therefore, the wires of adjacent layers normally do not touch each other. In the braided construction on the other hand, the braided strands are in metal-to-metal contact where they are bent over and under each other.

It has been found that a hose used in a system where internal hose pressure is alternately applied and released, the hose alternately radially expands and contracts. Such operation with a hose having a braided reinforcement results in relatively rapid hose wear because the previously mentioned metal-to-metal contact causes rapid wear. This problem has necessitated the use of relatively thin, flexible wire, which has the disadvantage of being relatively weak.

In the spiral construction on the other hand, adjacent layers of wire are maintained out of contact by the interlay and consequently the problem of metal-to-metal contact and resulting wear does not exist. Therefore it has been possible to use stronger and stiffer wire in this type of hose.

Since hose having the spiral construction would be made stronger than hose having the braided construction for approximately the same wall thickness, it would seem that the spiral construction is preferable for high pressure applications. The spiral construction has not always been used however because conventional hose fittings are not able to grip the spiral constructions tightly enough to prevent blow-off at high pressure. Conventional fittings include teeth on the nipple and the socket which are designed to compress and dig into the bared reinforcement in order to grip it. However, the outer surface of the reinforcement of a spiral construction is relatively smooth and therefore the teeth are not able to dig deeply into the reinforcement. For braided hose, on the other hand, the outer surface of the reinforcement is relatively rough and the teeth are able to dig into the reinforcement and grip it. Conventional fittings are accordingly usually used with braided hose because they can grip it, but of course such a hose and fitting assembly does not have as high pressure rating as is often desired.

An advantage of a fitting having a gripping section as described is that it is able to firmly grip either a braided or a spiral hose at the rate pressure of the hose. For a fitting and hose of the spiral construction, the maximum rated pressure may be very high because the hose may be made relatively strong. The fitting is able to grip the spiral hose because it does not rely for gripping on teeth which must dig into the reinforcement, to be effective. Instead, the fitting bends and compresses the reinforcement in order to grip it, which has the advantage not only of providing a firm grip but also, there is no tendency to cut or crack the wires of the reinforcement. Further, the inner tube does not extend into the gripping section, and consequently cannot effect the grip on the wire reinforcement.

In addition, if there is a tendency for the hose to be pulled away from the fitting, the pull may tend to reduce the diameter of the portion of the wire reinforcement in the gripping section causing the wire to tighten around the nipple. The sine wave form disclosed produces a greater tightening effect and a better grip on the hose than heretofore obtained using conventional fittings.

In addition to firmly gripping the hose, the hose and fitting assembly also forms an effective seal which prevents fluid from leaking out of the assembly at low and at very high pressures. In the rearward or compression sealing section, the inner tube 12 is held under compression against the outer surface of the nipple and thereby forms a seal which is particularly effective at low pressures. The ribs 29 on the nipple help to maintain the seal by preventing movement of the inner tube 12, and they create lines of stress which further increase the effectiveness of the seal, and furthermore they break up any minute flow paths that might be created by longitudinal scratches in the outer surface of the nipple 18.

The forward or gland sealing section provides assurance against leakage at relatively high fluid pressures. Any internal fluid under pressure, which leaks between the nipple and inner tube past the compression sealing section flows between the flap 48 and the outer periphery of the nipple, and to the forward end of the inner flap 48. The high pressure of this fluid activates the gland sealing action by forcing the inner flap radially outward into tight engagement with the inner surface of the insert 19, which tight engagement forms a seal and prevents further flow of the fluid. The weld 44 prevents the fluid from leaking forwardly between the nipple and the insert.

It will be apparent that the foregoing fitting has numerous advantages. The gripping and sealing sections are separated so that neither can affect the proper functioning of the other. In the gland sealing section both the nipple and the socket are recessed so that the inner and outer flaps are substantially free from compression even though the socket is crimped. Since the gland sealing section relies on fluid pressure to effect a seal while the compression sealing section relies on the compressive forces exerted by the nipple and the socket to effect a seal, the gland sealing section is more effective at high fluid pressures while the compression sealing section is more effective at low fluid pressures. Further, the gland sealing section maintains its effectiveness for a relatively long time at sustained high temperatures.

We claim:

1. A fitting for a hose including an inner tube surrounded by a reinforcement, a portion of the inner tube adjacent the end of the hose being removed to substantially bare an end portion of the reinforcement, and an annular slit being formed in the end of the inner tube and thus forming radially inside and radially outside portions at said end of the inner tube, said fitting comprising a socket member and a nipple member secured together and providing an annular opening closed at the forward end for receiving the end of the hose, said socket member and said nipple member including means at the forward end portion of said annular opening for tightly gripping said bared portion of said reinforcement, said fitting further comprising a rigid insert positioned within said annular opening rearwardly of said gripping means and substantially concentrically with said socket member and said nipple member, said insert including a tubular portion which is radially spaced from the outer and inner peripheries of said nipple and socket members respectively, and said insert also including a forward portion which sealingly engages said nipple member and which is held by said nipple member against forward movement relative to said nipple member, said tubular portion of said insert being adapted to extend into said annular slit, said socket member having a recess formed on its inner periphery radially opposite said tubular portion of said insert, said recess having a length substantially equal to the length of said tubular portion of said insert and preventing substantial compressive forces from being exerted on said radially outside portion of said inner tube, and the radial distance between the tubular portion of said insert and said nipple member being substantially equal to the thickness of said radially inside portion of the inner tube, the radial dimensions of said nipple member said insert and said socket member being such that said portions of the inner tube radially inside and radially outside said tubular portion of said insert are both substantially free from compression, said socket member and said nipple member extending rearwardly from said insert, and said socket member being adapted to be deformed to engage the reinforcement and compress said inner tube against said rearwardly extending portion of said nipple member.

2. A hose and fitting assembly, said hose comprising an inner tube surrounded by a reinforcement, a portion of the inner tube adjacent the end of the hose being removed to substantially bare an end portion of the reinforcement, and an annular slit being formed in the end of the inner tube and thus forming radially inside and radially outside portions at said end of the inner tube, said fitting comprising a socket member and a nipple member secured together and providing an annular opening closed at the forward end for receiving the end of the hose, said socket member and said nipple member including means at the forward end portion of said annular opening for tightly gripping said bared portion of said reinforcement, said fitting further comprising a rigid insert positioned within said annular opening rearwardly of said gripping means and substantially concentrically with said socket member and said nipple member, said insert including a tubular portion which is radially spaced from the outer and inner peripheries of said nipple and socket members respectively, and said insert also including a forward portion which sealingly engages said nipple member and which is held by said nipple member against forward movement relative to said nipple member, said tubular portion of said insert extending into said annular slit, said socket member having a recess formed on its inner periphery radially opposite said tubular portion of said insert, said recess having a length substantially equal to the length of said tubular portion of said insert and preventing substantial compressive forces from being exerted on said radially outside portion of said inner tube, and the radial distance between the tubular portion of said insert and said nipple member being substantially equal to the thickness of said radially inside portion of the inner tube, the radial dimensions of said nipple member, said insert and said socket member being such that said portions of the inner tube radially inside and radially outside said tubular portion of said insert are both substantially free from compression, said socket member and said nipple member extending rearwardly from said insert, and said socket member being deformed to engage the reinforcement and compress said inner tube against said rearwardly extending portion of said nipple member.

References Cited

UNITED STATES PATENTS

| 2,463,293 | 3/1949 | Mentel | 285—149 |
| 3,333,325 | 8/1967 | Goward | 285—149 X |
| 3,347,571 | 10/1967 | New | 285—256 X |

FOREIGN PATENTS

| 202,751 | 8/1956 | Australia. |
| 204,853 | 12/1956 | Australia. |

CARL W. TOMLIN, *Primary Examiner.*

THOMAS F. CALLAHAN, *Assistant Examiner.*

U.S. Cl. X.R.

285—256